Dec. 16, 1930.  A. E. BRONSON  1,784,817
HAND GRIP AND AIR CONNECTER
Filed Aug. 12, 1927
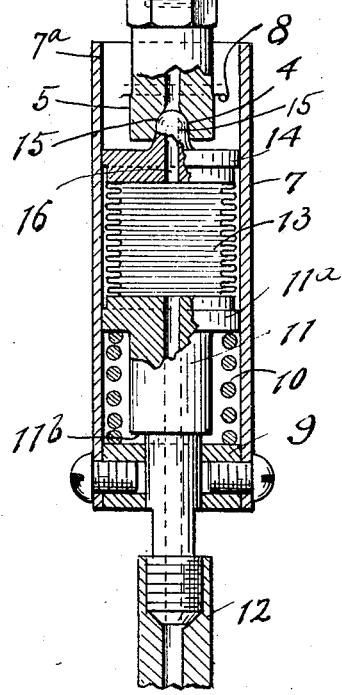
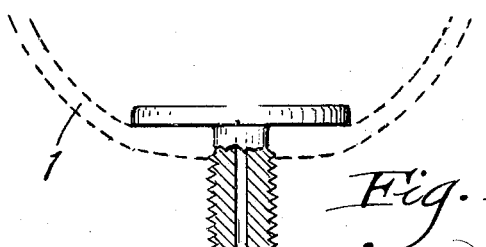
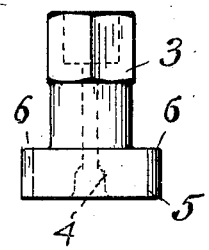
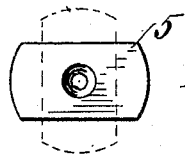
Inventor
Adelbert E. Bronson
By Kwis Hudson & Kent
Attorney Patented Dec. 16, 1930

1,784,817

UNITED STATES PATENT OFFICE

ADELBERT E. BRONSON, OF CLEVELAND HEIGHTS, OHIO, ASSIGNOR TO THE DILL MANUFACTURING COMPANY, OF CLEVELAND, OHIO, A CORPORATION OF OHIO

HAND GRIP AND AIR CONNECTER

Application filed August 12, 1927. Serial No. 212,445.

The present invention relates to a head or chuck for making connection between an air line and a device to which air is to be supplied.

Without in any way limiting the scope of the invention, it may be stated that the device is particularly intended for making connection between a sectional air manifold used in connection with supplying air to the interior of air bags used in vulcanizing rubber tire casings, and the air stems of the air bags which are within the tire casing.

Reference should be had to the accompanying drawings forming a part of this specification in which:

Fig. 1 is a sectional elevation showing the device of the present invention in operative connection with the air stem of an air bag;

Fig. 2 is an elevation of a head which is employed with the air stem;

Fig. 3 is an end elevation of the showing in Fig. 2;

Fig. 4 is an end elevation of the connecting device;

Fig. 5 is a sectional elevation of a portion of the air connecting device.

Referring to the drawings, 1 indicates an air bag such as is customarily used in connection with vulcanizing rubber tire casings, each such air bag being provided with a stem, as indicated at 2, and with an opening extending longitudinally therethrough. In the present instance, at the end of the stem 2 there is a head 3 which is secured to the stem 2 which head has an opening extending longitudinally therethrough, and at its outer end is provided with a seat 4 which, in the present instance, has a recessed depression in the end of the head formed with walls to cooperate with a portion of the device, to be later explained.

The member 3 has at one end a rectangular portion 5 which is adapted to cooperate with portions, later to be explained, to form a locking or retaining connection. This portion 5 has extensions 6 which function as retaining shoulders, as will later be explained. The air connection, or hand grip as it is sometimes called, comprises an outer casing 7 which is so mounted as to be rotatable. At the open end of the casing 7 inwardly extending shoulders 8 are formed which are adapted to cooperate with the shoulders 6 formed on the member 3. In other words, the member 3 may be introduced into the end of the tubular portion 7 inasmuch as the rectangular portion 5, shown in Fig. 3, fits in the rectangular end portion 7a at the end of the tubular portion 7. When these members have been brought into association by turning the member 3 or the sleeve 7, the shoulders 6 will engage behind the shoulders 8.

In the sleeve 7 at the opposite end there is a closure member 9 against which there seats a spring 10. Extending through the closure member 9 is a member 11 which is provided with a central longitudinal air passage, and this member 11 cooperates with an air inlet tube 12. These tubes 12 are customarily made of flexible copper tubing. The spring 10 bears against the head 11a of the member 11 which, as before stated, is capable of having a slight movement with respect to the tube 7.

To the head 11 there is secured one end of a metal corrugated bellows 13, which bellows at its opposite end is connected with a slidable head 14. This slidable head has an extension 15 which is so formed as to cooperate with the recess in the end 5 of the member 3 and the member 15 being substantially spherical at its end portion will engage with the metal walls of the recess 4 to make a metal-to-metal seat. The head 14 and the extension 15 are provided with an air opening 16. It should be noted that the head 11a and the head 14 are both provided with portions of such diameter as to engage with the inner wall of the sleeve or tube 7, and are capable of movement with respect thereto.

When the connection between the member 3 and the sleeve 7 is effected, the projection 15 will engage in the recess 4 and the head 14 may be pushed inwardly in order to permit the shoulders 6 to move behind the shoulders 8 and be turned with respect thereto. This movement will, however, be against the action of the spring 10, and the spring 10 will normally move the parts so as to retain the engagement between the member 3 and the sleeve 7. However, if it is desirable to maintain a more effective connection between the projection 15 and the recess 4 in order to avoid the leakage of air, it might result in an ineffective connection when air under pressure is being supplied to the air bag. This is accomplished by the provision of the bellows 13.

As will be seen, the air entering through the supply tube 12 must necessarily pass through the bellows 13 and the air under pressure within the bellows will exert a pressure upon the head 14 and a reacting pressure against the head 11a. The member 11 has a shoulder 11b which when the member 11 is moved outwardly will engage with the member 9, thus permitting a fixed stop for the movement of the member 11. Pressure will also be exerted against the head 14 and such pressure will force the projection 15 into closer engagement with the walls of the recess 4 and increasing air pressure will provide increasing engagement pressure between the extension 15 and the walls of the recess 4, thus insuring non-leaking conditions.

In using such a hand connecter for the purpose of connecting sections of an air manifold with the air bag stems, when the molds containing the tires are within a vulcanizer, it must be accomplished with considerable rapidity in order not to delay the loading of the vulcanizer. The present hand grip prevents all of these conditions because the connection may be effected by bringing the end of the hand grip into relation with the end of the head 3 which is at the end of the air stem, and, in addition, the present construction provides for a certainty of connection to thereby prevent the escape of air.

Having thus described my invention, I claim:

1. In a device of the character described, the combination with a sleeve member, a pair of heads within the sleeve and movable with respect thereto, a flexible means connecting said heads and forming a chamber between the same, means carried by the sleeve and cooperating with an extension from one of said heads for guiding said head in its movement and providing a stop limiting the movement of said head, a spring normally urging said last-mentioned head toward the other of said heads, said other head being provided with a formation for cooperation with a member to which air is to be supplied, the first mentioned head being provided with an air passage through which air may be introduced into the chamber between the heads.

2. In a device of the character described, the combination with a sleeve member, a second member, interengaging formations formed on the sleeve and second member whereby the sleeve and second member may be attached or detached by rotative movement, a pair of members within the sleeve which are movable with respect to the sleeve, a flexible means connecting the said movable members and forming a chamber between the same, one of the movable members within the sleeve being provided with a part which cooperates with a portion of the second member before-mentioned to form a seat, one end of said sleeve being provided with a closure member, a spring cooperating with said closure member and with the adjacent movable member within the tube, said last mentioned movable member having an extension extending through an opening in said closure, the said extension and movable member, of which it is a part, being provided with an air passage therethrough.

In testimony whereof I hereunto affix my signature.

ADELBERT E. BRONSON.